(12) United States Patent
Thompson et al.

(10) Patent No.: US 10,581,715 B1
(45) Date of Patent: Mar. 3, 2020

(54) ADAPTIVE RECOVERY BASED ON INCAST

(71) Applicant: Amazon Technologies, Inc., Seattle, WA (US)

(72) Inventors: James Michael Thompson, Seattle, WA (US); Valentin Gabriel Priescu, Seattle, WA (US); Dragos Diaconescu, Seattle, WA (US); Colin Harrison Brace, Mercer Island, WA (US); Anandh Mahalingam, Redmond, WA (US); Danny Wei, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 385 days.

(21) Appl. No.: 15/386,841

(22) Filed: Dec. 21, 2016

(51) Int. Cl.
*G06F 15/16* (2006.01)
*H04L 12/26* (2006.01)
*H04L 29/08* (2006.01)
*H04L 29/06* (2006.01)

(52) U.S. Cl.
CPC .............. *H04L 43/16* (2013.01); *H04L 67/32* (2013.01); *H04L 67/42* (2013.01)

(58) Field of Classification Search
CPC ............. H04L 41/5025; H04L 41/0816; H04L 41/0896; H04L 43/16; H04L 43/0888; H04L 47/10; H04L 47/25; H04L 47/6255; H04L 67/2823

USPC .................................................... 709/223, 224
See application file for complete search history.

(56) References Cited

U.S. PATENT DOCUMENTS

| | | | | |
|---|---|---|---|---|
| 2005/0257082 | A1* | 11/2005 | Zohar | G06F 3/0611 714/6.23 |
| 2011/0170408 | A1* | 7/2011 | Furbeck | H04L 47/10 370/230 |
| 2012/0131129 | A1* | 5/2012 | Agarwal | H04L 43/0852 709/216 |
| 2016/0352721 | A1* | 12/2016 | Ota | H04L 63/083 |
| 2017/0104629 | A1* | 4/2017 | Cobb | H04L 41/0816 |
| 2017/0171091 | A1* | 6/2017 | Nayak | H04L 47/25 |

* cited by examiner

*Primary Examiner* — Wing F Chan
*Assistant Examiner* — Andrew Woo
(74) *Attorney, Agent, or Firm* — Knobbe Martens Olson & Bear LLP

(57) ABSTRACT

Systems and methods for an incast mitigation approach that first modifies network responses for content requests above a threshold size to be delayed according a response latency selected from an established latency range. Additionally, as incast characteristics are analyzed from network traffic, the volumes can selectively modify the individual established latency range to increase the latency range during periods of higher incast characteristics and to decrease the latency range when incast characteristics appear to be decreasing.

20 Claims, 14 Drawing Sheets

ADAPTIVE RECOVERY BASED ON INCAST

BACKGROUND

Generally described, organizations operate computer networks that interconnect numerous computing systems in support of the organizations' operations. Data centers may house significant numbers of interconnected computing systems, such as private data centers operated by a single organization and public data centers operated by third parties to provide computing resources to customers. Public and private data centers may provide network access, power, hardware resources (e.g., computing and storage), and secure installation facilities for hardware owned by an organization or its customers.

To facilitate increased utilization of data center resources, virtualization technologies allow a single physical computing machine to host one or more instances of virtual machines that appear and operate as independent computing machines to a connected computer user. With virtualization, a single physical computing device can create, maintain, or delete virtual machines in a dynamic manner. In turn, users can request computing resources from a data center and be provided with varying numbers of virtual machine resources on an "as needed" or "as requested" basis. In addition to virtual machines, a data center may provide other computing resources, including hardware computing capacity, data storage space, network bandwidth, and the like.

In some embodiments, an individual client may utilize multiple service provider services at the same time or substantially the same time. For example, a client can transmit multiple requests to a network storage service, which can result in the return of a set of data to the client responsive to the request.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
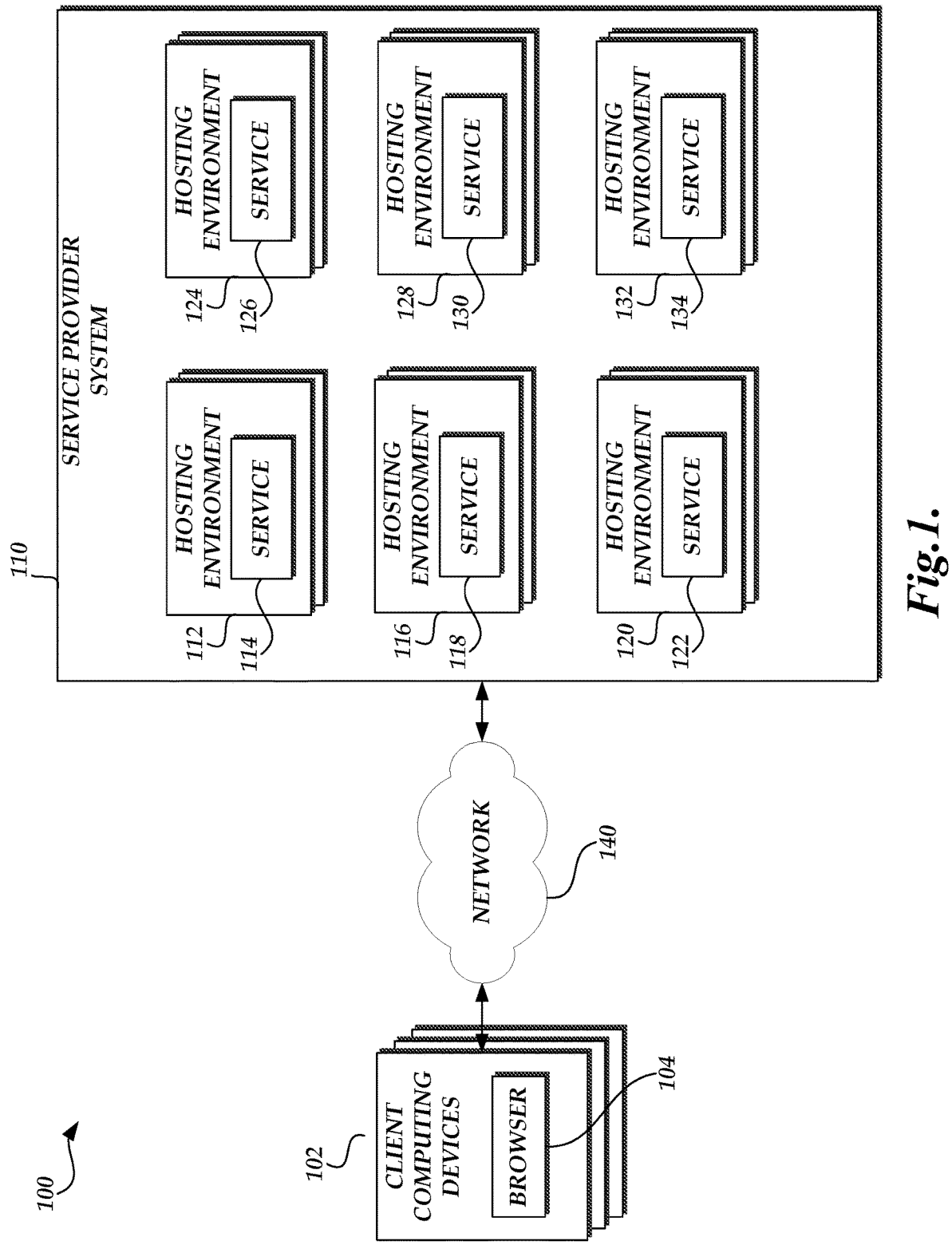
FIG. 1 is a block diagram depicting an illustrative logical network including multiple client computing devices and a service provider network.

Generally described, the present application corresponds to management of network services and network data requests. More specifically, aspects of the present application relate to the processing of content requests based on utilization of an introduced latency in providing responses to content requests. Illustratively, individual servers or hosts can select the latency from a range of network latencies. Other aspects of the present application relate to the dynamic modification of the range of network latencies based on characteristics of network throughput, such as incast.

In accordance with an illustrative embodiment, service providers can provide a storage service to customers accessible by transmitting network requests for content to storage servers, or volumes, with a service provider network. A volume may be a logical volume for storing customer data that is dispersed over multiple different storage servers. The network requests can be transmitted over a communication network by client computing devices external to the service provider network. In other embodiments, the network service requests can be transmitted from a virtual machine corresponding to the customer and hosted on the service provider network. For purposes of illustrating aspects of the present application, in some embodiments, an individual client computing device (or set of client computing devices corresponding to a common customer) transmits a plurality of requests for content to a set of individual network volumes.

Generally described, the requests for content are transmitted in accordance with a network transmission protocol, such as the transmission control protocol ("TCP"), that defines how computing devices exchange data via a communication network. Additionally, such network transmission protocols can be configured as guaranteed delivery network protocol in which a content source will attempt to re-transmit data that cannot be confirmed to have been received by a requesting computing device. Assuming all authentication and security requirements are met, as valid requests are received by the individual volumes, the responses are processed so that the volume can transmit the requested content to the client. If an acknowledgment signal or message is not received by the individual volumes within an established time period, the volumes will attempt to retransmit the requested content.

In accordance with the illustrative example, a single client can transmit multiple requests to a number of volumes, such for a set of data maintained by multiple, individual volumes. Generally, the individual volumes would typically attempt to transmit the requested content without any coordination of transmission, or knowledge, among the individual volumes.

As such, network congestion measured at the requesting client or at network components, such as routers, switches, etc., utilized by the requesting client can result as multiple responsive communications are received and queued for processing. Because of network congestion, the requesting computing device may not transmit acknowledgement messages to the various individual volumes within a defined time period. Accordingly, the individual volumes would consider the lack on acknowledge as retransmit events and would attempt to retransmit the response. As such, under traditional implementation of guaranteed delivery network protocols, such as TCP, the resulting network congestion from the initial transmissions and subsequent retransmissions of responsive content would diminish the network throughput and efficiency of the service provider and client interaction. Such congestion can be referred to as TCP incast or incast.

In accordance with aspects of the present application, volumes can implement logic that facilitates the inclusion of latency prior to transmitting or retransmitting requested content to requesting computing devices. The volumes select a latency value from a range of acceptable latency values such as via a random selection. In embodiments in which multiple volumes are attempting to transmit requested content at a substantially similar time to a single computing device (or smaller subset of devices), the selection of different latency values by at least some of the volumes can have the effect of staggering the transmission of content to the requesting computing device. The volumes can be further configured with additional logic to select what types of content requests may be included or excluded from the inclusion of latency, such as data size thresholds, content type selection criteria, requestor identifiers, and the like.

In accordance with other aspects of the present application, in addition to implementing the inclusion of latency values as discussed above, the volumes can include further logic that facilitates the modification of the latency ranges utilized to select latencies based on network characteristics. More specifically, volumes can observe network characteristic in the form of recast requests or determinations as indicative of the TCP incast for specific connection to the requesting computing device. As TCP incast increases at the requesting device (e.g., an increase in data processing queue or dropping of received data packets due to a full processing queue), the individual volumes can observe the number of retransmit determinations that occur while attempting to deliver requesting content. The observation can be based on an absolute counting of events, a moving average of events, weighted averages, and the like. Additionally, in some embodiments, the volumes may receive information from external sources, such as networking equipment associated with the requesting computing devices.

In one embodiment, the volumes can then compare the observed information to a retransmit event threshold. If exceeded, the volumes can the dynamically modify the latency value range to increase the latency values available to the volume. The volume will continue to respond to the content requests by selecting a latency volume from the modified latency value ranges. Additionally, the dynamic modification of the latency ranges can continue until a maximum value is reached or until the number of retransmit events fall below the retransmit even threshold. Once the retransmit events begin to decrease, the volumes can dynamically modify the latency value range to decrease the latency values. Illustratively, the volumes may increase the latency value range in a different manner than the decrease in the latency value range. For example, the volumes may increase the latency value ranges according to an exponential function while decreasing the latency value ranges according to a linear function.

Although aspects of some embodiments described in the disclosure will focus, for the purpose of illustration, on the illustrative interactions for requesting content and processing of content requests by network-based volumes with specific ranges of latencies, one skilled in the relevant art will appreciate that the examples are illustrative only and are not intended to be limiting. Still further, although the present application will be described with regard to illustrative to specific network protocols, such as TCP, such examples are illustrative in nature and should not be construed as limiting. Accordingly, one or more aspects of the present application may be applicable with regard to different network protocols.

FIG. 1 is a block diagram depicting an illustrative logical network 100 including multiple client computing devices 102 and a service provider system 110 in communication via a network 140. While the client computing devices 102 are shown as a group within FIG. 1, the client computing devices 102 may be geographically distant, and independently owned or operated. For example, the client computing devices 102 could represent a multitude of users in various global, continental, or regional locations accessing the service provider system 110. Accordingly, the groupings of client computing devices 102 within FIG. 1 is intended to represent a logical, rather than physical, grouping. Similarly, while one set of illustrative components is shown to represent the service provider system 110, multiple instances of each component may be present within the service provider system 110, and such components may be located within geographically diverse areas (e.g., globally, continentally, or regionally), in order to provide a wide geographical presence for the service provider system 110.

Client computing devices 102 may include any number of different computing devices capable of communicating with the service provider system 110. For example, individual accessing computing devices may correspond to a laptop or tablet computer, personal computer, wearable computer, server, personal digital assistant (PDA), hybrid PDA/mobile phone, mobile phone, electronic book reader, set-top box, camera, digital media player, and the like. Each client computing device 102 may include one or more data stores (not shown in FIG. 1) including various applications or computer-executable instructions, such as web browsers 104, used to implement the embodiments disclosed herein.

Network 140 may be any wired network, wireless network, or combination thereof. In addition, the network 140 may be a personal area network, local area network, wide area network, cable network, satellite network, cellular telephone network, or combination thereof. In the example environment of FIG. 1, network 140 is a global area network (GAN), such as the Internet. Protocols and components for communicating via the other aforementioned types of communication networks are well known to those skilled in the art of computer communications and thus, need not be described in more detail herein. While each of the client computing devices 102 and the service provider system 110 is depicted as having a single connection to the network 140, individual components of the client computing devices 102 and service provider system 110 may be connected to the network 140 at disparate points.

In accordance with embodiments, the service provider system 110 includes a set of hosting environments, illustrated in FIG. 1 as hosting environment 112, 116, 120, 124, 128, and 132. As described in further detail below, the hosting environments 112, 116, 120, 124, 128, and 132 can host one or more services 114, 118, 122, 126, 130, and 134. As will be discussed below, for purposes of illustration, some of the hosted services, such as services 126, 130, and 134, may correspond to virtual machine instances that operate one or more applications on behalf of a customer/client and can generate requests related to content. Examples can include, but are not limited to, data processing applications, multi-media applications, virtual desktops, and the like. Accordingly, aspects of the present application related to client requests may be transmitted from physical computing devices 102 associated with a service provider customer or via an instantiated application on the service provider system 110, such as via services 126, 130, and 134 on hosting environments 124, 128, and 132, respectively. As will be described in greater detail below, the client computing devices 102 or virtual machine instances on hosting services 126, 130, and 134 (illustratively) can generally referred to as "service clients" or "clients."

Other hosted services can include, for example, network-based storage, network-based browser applications, network-based data processing, and the like. Accordingly, in at least some embodiments, the interactions between a customer and the service provider may correspond to interactions between different services within the service provider system 110. For example, an instantiated graphics application, such as service 126, hosted on a hosting environment 124 may interact with a plurality of hosted storage servers, such as on hosts 112, 116, and 120, which may provide stored content. As will be described in detail below, for purposes of illustration, at least some of the hosts 112, 116, and 120 corresponding to the accessed services, e.g., a storage service or volume, will include additional logic or functionality that facilitates inclusion of latencies in providing content and dynamically modifying a range of available latency values. With regard to a storage service, the hosts, such as hosts 112, 116, and 120, can be generally referred to as "storage servers" corresponding to a logical volume accessible to one or more clients.

It will be appreciated by those skilled in the art that the service provider system 110 may have fewer or greater components than are illustrated in FIG. 1. Thus, the depiction of the service provider system 110 in FIG. 1 should be taken as illustrative. For example, in some embodiments, components of the service provider system 110, such as the hosting environment 112 and service 114 may be executed by one more virtual machines implemented in a hosted computing environment. Additionally, components such as hosting environment 116 may correspond to multiple physical or virtual computing resources that may logically represented as a single component, but may be implemented in a distributed manner.

Figure 2:
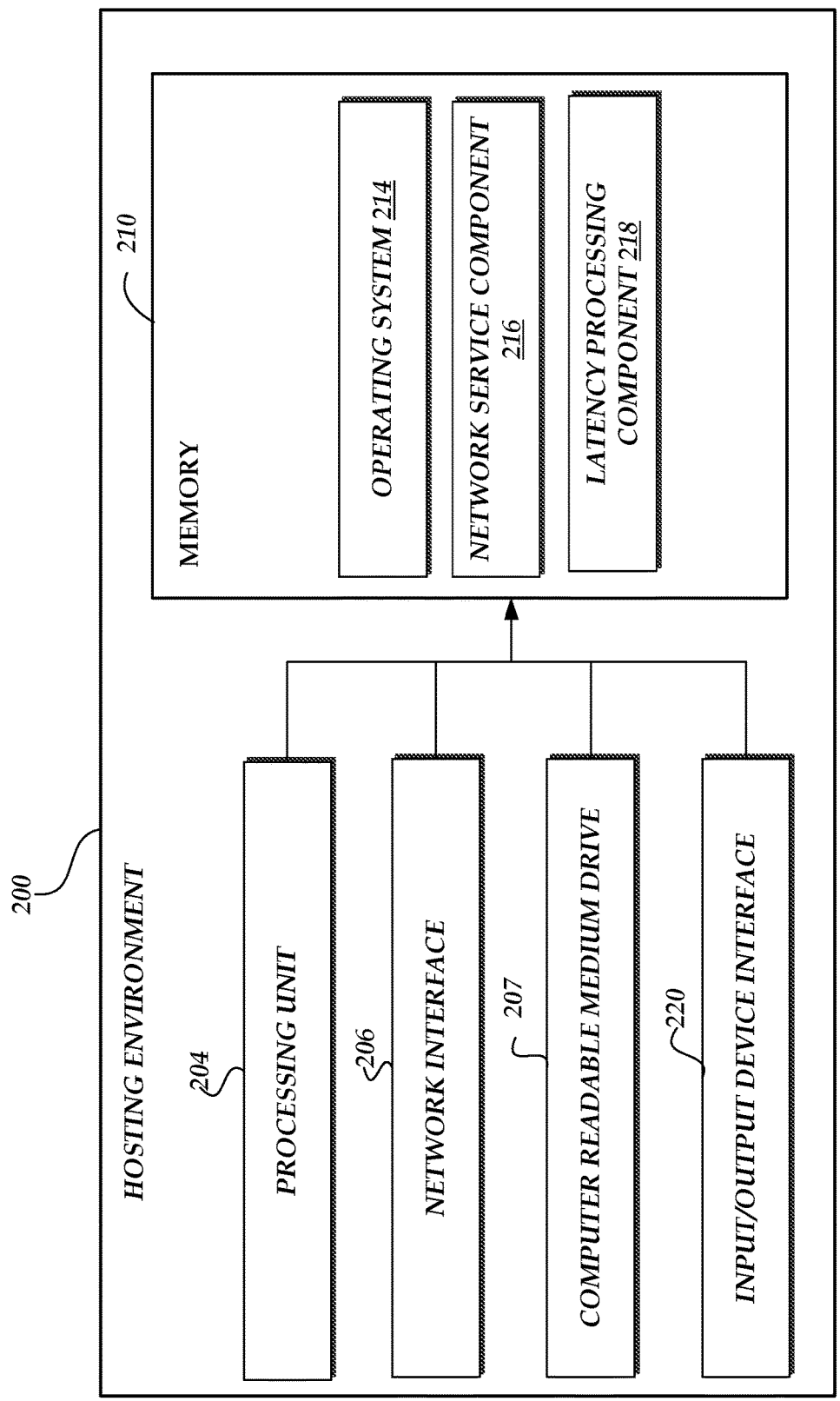
FIG. 2 is a block diagram of illustrative components of a hosting environment for hosting applications in accordance with the present application.

FIG. 2 depicts one embodiment of an architecture of an illustrative of hosting environment 200, such as hosting environment 112, 116, 120, 124, 128, and 132 that host virtualized applications, such as services 114, 118, 122, 126, 130, and 134 in accordance with the present application. The general architecture of the hosting environment depicted in FIG. 2 includes an arrangement of computer hardware and software components that may be used to implement aspects of the present disclosure. As illustrated, the hosting environment includes a processing unit 204, a network interface 206, a computer readable medium drive 207, an input/output device interface 220, all of which may communicate with one another by way of a communication bus.

The network interface 206 may provide connectivity to one or more networks or computing systems, such as the network 140 of FIG. 1. The processing unit 204 may thus receive information and instructions from other computing systems or services via a network. The processing unit 204 may also communicate to and from memory 210 and further provide output information. In some embodiments, the hosting environment may include more (or fewer) components than those shown in FIG. 2.

The memory 210 may include computer program instructions that the processing unit 204 executes in order to implement one or more embodiments. The memory 210 generally includes RAM, ROM or other persistent or non-transitory memory. The memory 210 may store an operating system 214 that provides computer program instructions for use by the processing unit 204 in the general administration and operation of the functionality implemented by the host computing device. The memory 210 may further include computer program instructions and other information for implementing aspects of the present disclosure. For example, in one embodiment, the memory 210 includes a host network service component 216 that corresponds to functionality provided by the instantiation of the host computing device illustrated in FIG. 1 as services 114, 118, 122, 126, 130, and 134. Examples of such functionality includes, but is not limited to, a data processing application, network storage services, content delivery applications, streaming services, and the like. As illustrated in FIG. 2, the host environment 200 includes a latency processing component 218 for determining a latency to be introduced in providing information from the host application to the requesting computing device 102. The functionality implemented by the latency processing component 218 will be described in greater detail below. Additionally, although illustrated as separate functionality, one or more aspects of the latency processing component 218 may be implemented as part of the execution of the network service component 216.

Figure 3:
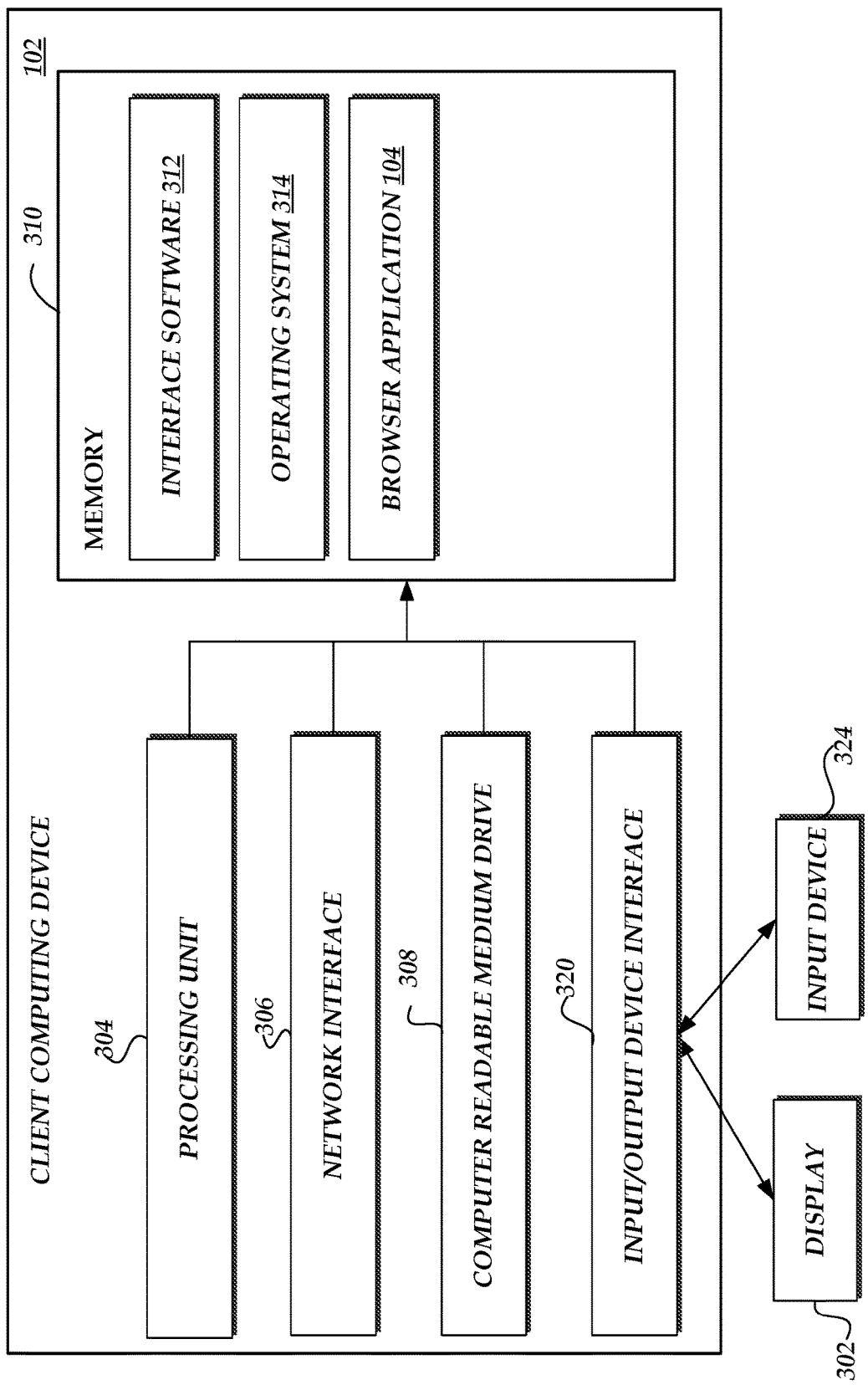
FIG. 3 is a block diagram of illustrative components of a client computing device for us use in generating requests for content in accordance with the present application.

FIG. 3 depicts one embodiment of an architecture of an illustrative a client computing device 102 that can generate and process browser content in accordance with the present application. The general architecture of the client computing device 102 depicted in FIG. 3 includes an arrangement of computer hardware and software components that may be used to implement aspects of the present disclosure. As illustrated, the client computing device 102 includes a processing unit 304, a network interface 306, a computer readable medium drive 307, an input/output device interface 230, an optional display 302, and an input device 324, all of which may communicate with one another by way of a communication bus.

The network interface 306 may provide connectivity to one or more networks or computing systems, such as the network 140 of FIG. 1. The processing unit 304 may thus receive information and instructions from other computing systems or services via a network. The processing unit 304 may also communicate to and from a memory 310 and further provide output information for an optional display 302 via the input/output device interface 330. The input/output device interface 320 may also accept input from the input device 324, such as a keyboard, mouse, digital pen, etc. The inputs to the client computing device 102 may be internal to the device, such as contained within a housing, or external to the device and connected via a wired or wireless interface.

The memory 310 may include computer program instructions that the processing unit 304 executes in order to implement one or more embodiments. The memory 310 generally includes RAM, ROM or other persistent or non-transitory memory. The memory 310 may store an operating system 314 that provides computer program instructions for use by the processing unit 304 in the general administration and operation of the client computing device 102. The memory 310 may further include computer program instructions and other information for implementing aspects of the present disclosure. For example, in one embodiment, the memory 310 includes a browser component 104 for accessing content and communicating with and processing information from one or more hosting environments.

Figure 4:
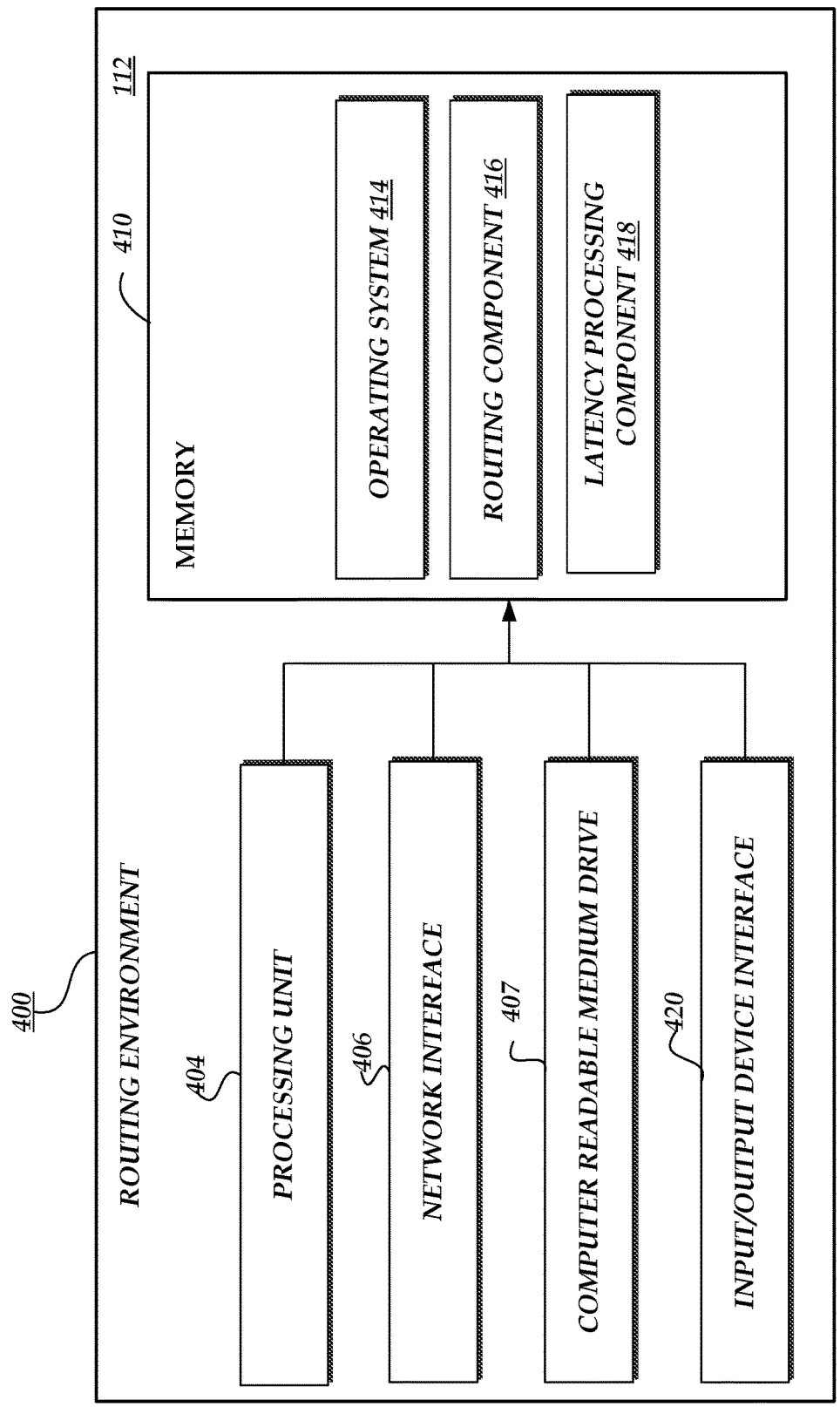
FIG. 4 is a block diagram of illustrative components of a network component for managing requested data for a client computing device in accordance with the present application

As discussed above, in some embodiments, aspects of the present application can include network components 400 that facilitate that inclusion of latency in content responses. FIG. 4 depicts one embodiment of an architecture of an illustrative network routing component 400 in communication with the service provider system 110 and the client computing device 102 in accordance with the present application. The general architecture of the network component 400 depicted in FIG. 4 includes an arrangement of computer hardware and software components that may be used to implement aspects of the present disclosure. As illustrated, the network component 400 includes a processing unit 404, a network interface 406, a computer readable medium drive 407, an input/output device interface 420, all of which may communicate with one another by way of a communication bus.

The network interface 406 may provide connectivity to one or more networks or computing systems, such as the network 140 of FIG. 1. The processing unit 404 may thus receive information and instructions from other computing systems or services via a network. The processing unit 404 may also communicate to and from memory 410 and further provide output information. In some embodiments, the hosting environment may include more (or fewer) components than those shown in FIG. 2.

The memory 410 may include computer program instructions that the processing unit 404 executes in order to implement one or more embodiments. The memory 410 generally includes RAM, ROM or other persistent or non-transitory memory. The memory 410 may store an operating system 414 that provides computer program instructions for use by the processing unit 404 in the general administration and operation of the network routing component. The memory 210 may further include computer program instructions and other information for implementing aspects of the present disclosure. For example, in one embodiment, the memory 210 includes a routing component 416 that corresponds to functionality provided by the component to route communications between a client computing device 102 and the service provider system 110. The network component 400 includes a latency processing component 418 for determining a latency to be introduced in providing information from a storage server to the requesting computing device 102 or for providing information to the storage server.

Turning now to FIGS. 5A-5B, 6A-6C, and 7A-7B, illustrative interactions between the components of the logical network 100 for processing content requests transmitted from a client to a volume with the inclusion of latency will be described. FIGS. 5, 6, and 7 will be described with regard to transmission of requests, such as I/O requests, transmitted by a service client 502, such as a virtual machine instance. However, as previously described, the service client 502 can also include client computing devices 102 that can transmit requests, such as I/O requests. Additionally, for purposes of an illustrative example, the hosting environments 112, 116, and 120 implementing a service 114, 118, and 122 may correspond to a service provider environment with "storage servers" for hosting a block-based storage service, which stores data in volumes. Logical volumes may store data blocks on a single storage server or across multiple physical storage servers, such as those in 112, 116, and 120. Although hosting environments 112, 116, and 120, and services 114, 118, and 122 are shown as distinct, they may be the same hosting environment hosting the same service, such as a block-based storage service comprised of storage servers. Accordingly, such designations should not be construed as being limiting. Although FIGS. 5A-5B, 6A-6C, and 7A-7B will be described with regard to access interaction between a service client 502 and volumes and/or storage servers, one skilled in the relevant art will appreciate that present application is not limited to storage server or storage service interaction.

Figure 5A:
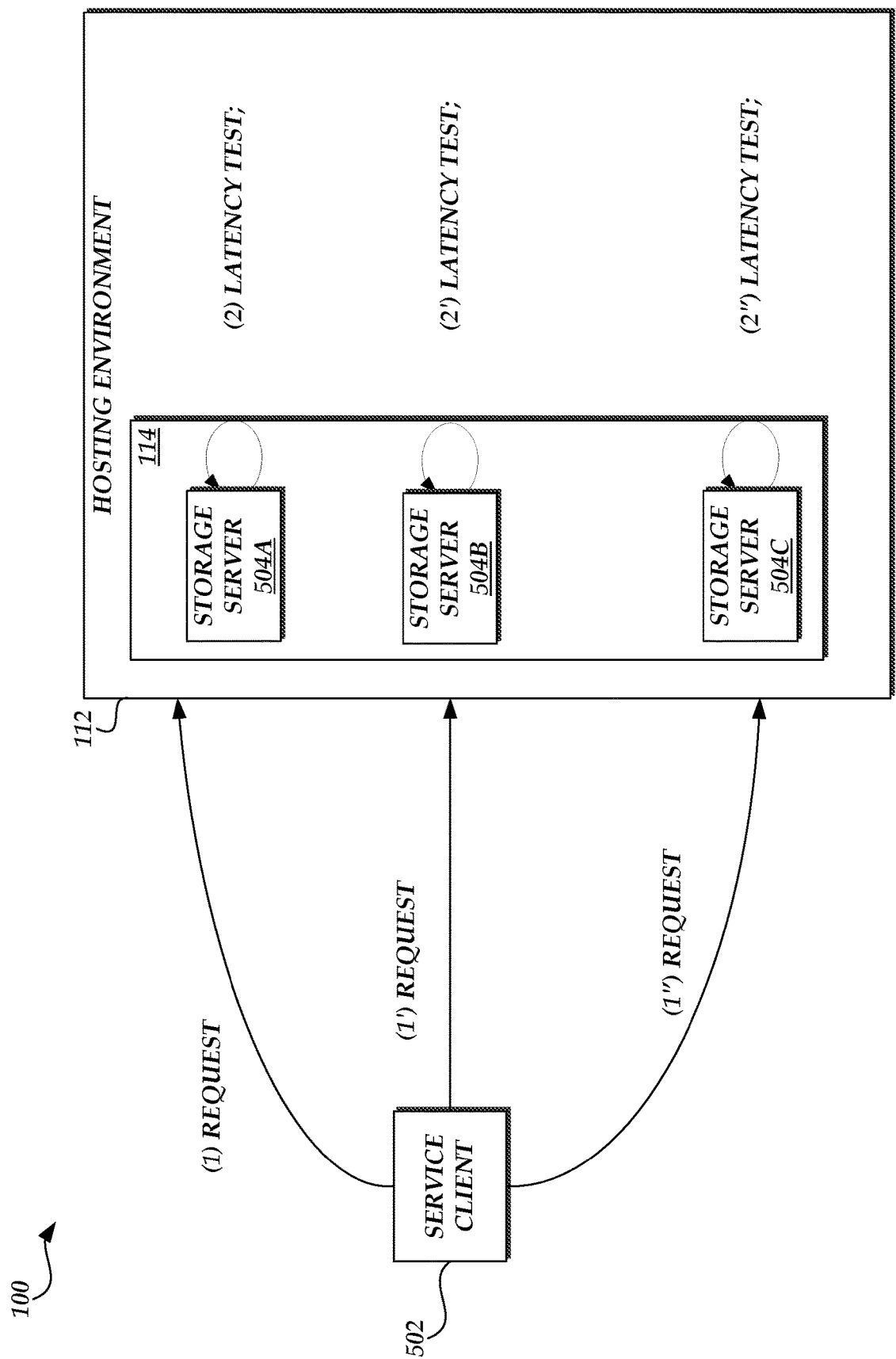
FIGS. 5A-5B are block diagrams of the logical network of FIG. 1 illustrating the requesting and processing data requests utilizing a determined latency in the returned response in accordance with the present application.

With reference to FIG. 5A, an example is provided in which the service client 502, such as a virtual machine, is sending requests (e.g., I/O requests) to block-based storage service, which may be hosted in hosting environment 112 and host storage volumes spread across storage servers 504 in the block-based storage service 114. In this example, the service client 502 transmits three requests for content to three storage servers 504A, 504B, and 504C, which are illustratively hosted in in service 114, respectively. In this example, the three requests may correspond to parts of the same logical storage volume that is partitioned across the different storage servers 504. Illustratively, each of the requests transmitted by the service client 502 to respecting storage servers 504A, 504B, and 504C can be transmitted in accordance with a network protocol, such as TCP, which is a guaranteed delivery network protocol. In such embodiments, the service client 502 may interact with the each respective storage server 504A, 504B, and 504C for purposes of authority, authentication and other handshaking functionality (e.g., establishing network transmission configurations). Accordingly, although only a single transmission is illustrated, the interaction between the service client 502 and the storage servers 504A, 504B, and 504C can include multiple communications/exchanges. Additionally, in some embodiments, service client 502 can be hosted in the same environment 112 as the service 114. Additionally, in other embodiments, the service client 502 can transmit requests to storage servers provided by multiple services, such as services 118 and 122.

At (2), each of the respective storage servers 504A, 504B, and 504C conducts a latency determination to determine whether any responsive transmissions should be associated with a latency prior to attempting to transmit to the service client 502. Illustratively, in some embodiments, the latency determination can be based on whether the size of the requested data transmission exceeds a size threshold, for example 32 KB for each data packet. In other embodiments, the latency determination can be based on a data type identifier that identifies a type of content and whether an additional latency can be acceptable. In still other embodiments, that latency determination can be based on an identifier associated with the service client 502 and whether an additional latency is acceptable according to service level agreements provided the service provider, such as for network data throughput. In still other embodiments, the latency determination can be based on a priority designation provided by the service client 502 regarding the relative importance of the requested content and whether any additional latency can be tolerated. Other embodiments would be applicable as well. The size threshold can be static in nature (e.g., pre-configured) or dynamically modified by individual storage servers or groups of servers.

Figure 5B:
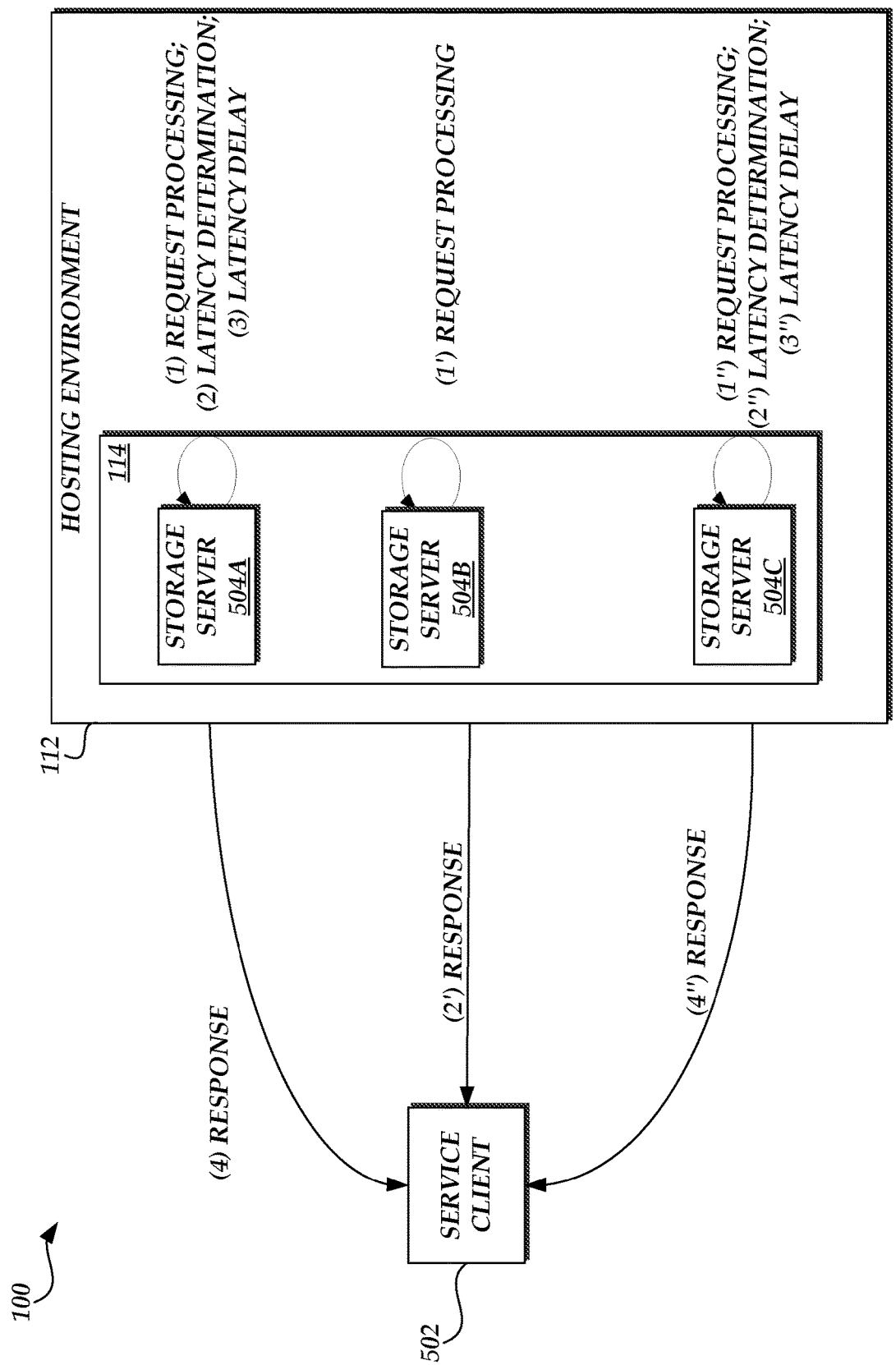

Turning now to FIG. 5B, for purpose of illustration, storage servers 504A and 504C determine that the latency threshold has been met while storage server 504B determines that the latency threshold has not been met. At (1), all the storage servers 504A, 504B, and 504C process the requests to obtain the requested content. For example, this content may correspond to data chunks or blocks hosted by the block-based storage service on the storage servers 504, which may act as a network attached hard drive for service client 502. For purposes of illustration, the processing of the request has been simplified to illustrate that each of the storage servers 504A, 504B and 504C independently process the content requests and prepare the requested content for transmission to the service client 502.

At (2) and (2"), the storage servers 504A and 504C conduct a latency determination based on determining a latency from an established range of latency values available to each respective host. Illustratively, individual hosts maintain a range of latency values that can be selected, such as via random selection or pseudo-random selection of a value. As will be described in detail below, the range of potential values can correspond to 600 to 800 microseconds. In comparison, at (2'), storage server 504B transmits the response to the service client 502 without including any additional latency prior to attempting to transmit the delay. At (3) and (3"), each respective storage servers 504A and 504C implements the selected latency and transmits the response to the service client 502 after including the selected latency prior to attempting to transmit the delay. Illustratively, the selected delay for storage servers 504A and 504C will likely be different based on the range of potential values. Still further, even though some hosts, such as storage servers storage servers 504A and 504C, may select the same latency values, the random nature of selection of values for larger numbers of hosts would likely result in at least some differences in selected values. By utilizing the latency determination threshold and the selection of latency values, the three storage servers 504A, 504B, and 504C have staggered the responsive communications to the service client 502. It should be appreciated, however, that the latency determination threshold does not necessarily need to be applied.

With reference to FIGS. 6A-6D, in some embodiments, the utilization of latency thresholds and the inclusion of latencies in responsive communications, as illustrated in FIGS. 5A and 5B, may still result in incast at the service client 502. For example, if the range of potential latency values is relatively small, the selection of different latency values may not be sufficient to allow the service client 502 (or associated networking components) sufficient time to process a larger volume or responsive communications from a plurality of hosts. Accordingly, as described previously, in another aspect, storage servers in a service, such as service 114, may be configured to dynamically modify the range of potential latency values by increasing the latency value range at times in which incast is likely occurring and to decrease the latency value range once incast is not likely occurring.

Figure 6A:
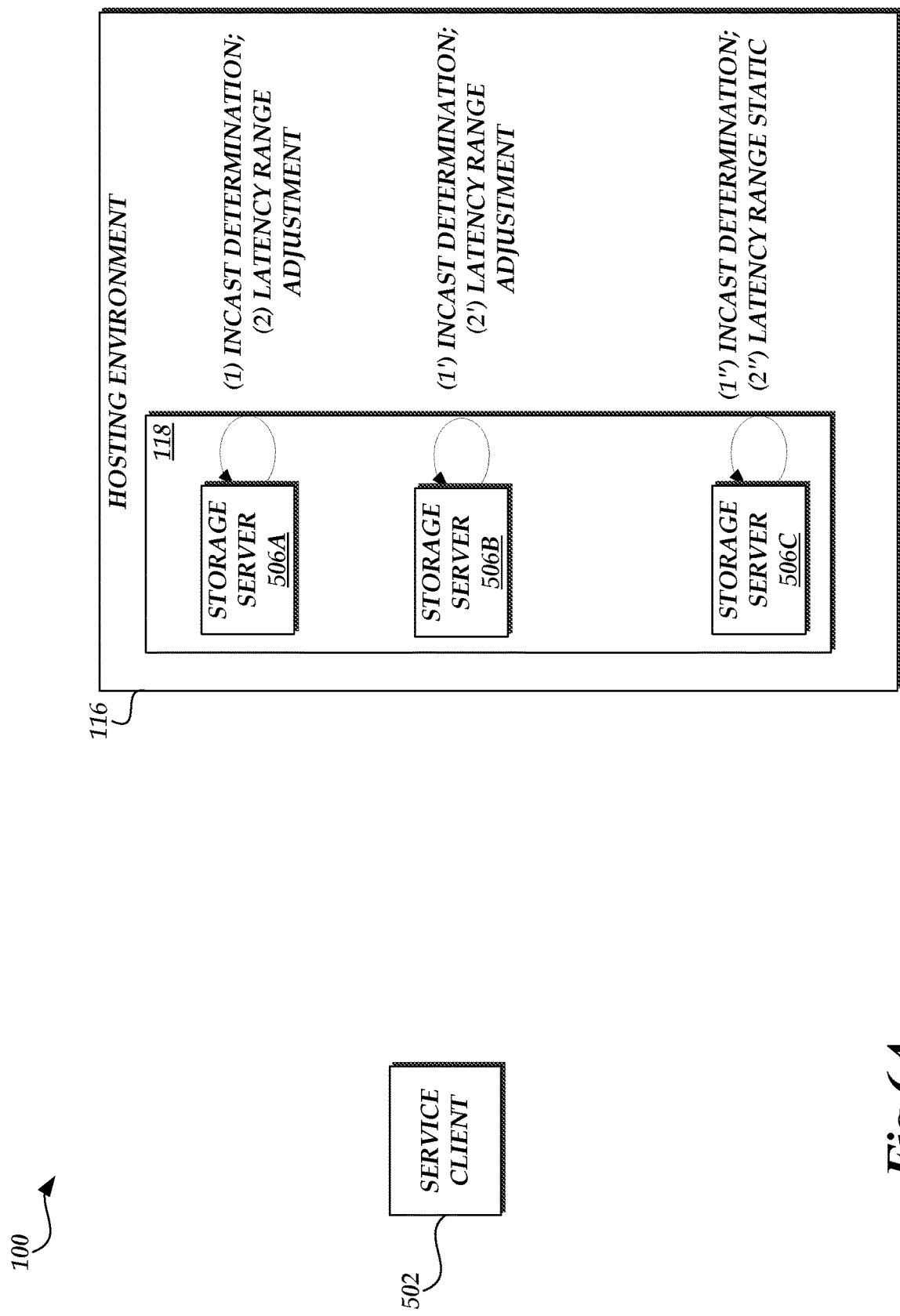
FIG. 6A is a block diagram of the logical network of FIG. 1 illustrating the adjustment of latency ranges based on incast determination in accordance with the present application.

With reference to FIG. 6A, individual storage servers 506A, 506 B, and 506C in service 118 can observe characteristics indicative of incast over a period of time. In one example, each of the storage servers 506A, 506 B, and 506C, can associate a number of retransmissions as network characteristics of incast. More specifically, for individual connections to a service client 502, each storage can associate maintain a count of a number of retransmission requests that are generated in transmitting content to the service client. The count may be a static count experience of a period of time, such as five second time window. In other embodiments, the count can be a moving window of retransmission counts. Still further, the retransmission count can be a weight averaged over time to attempt to account for increases or decreases in retransmissions. As will be explained in greater detail below, the storage servers 506A, 506B, and 506C can implement machine learning algorithms that can be utilized in context with the moving windows to make characterizations of whether incast is present. While this embodiment will be described solely with regard to counting retransmit requests, additional or alternative network characteristics can be also be utilized to make incast determinations.

At (1), (1') and (1"), individual storage servers 506A, 506 B, and 506C make a determination of whether incast is occurring at the service client 502. Illustratively, the individual storage servers 506A, 506 B, and 506C can compare the current retransmit count to a retransmit (or incast) threshold. The retransmit count can be selected to distinguish traditional network inefficiencies associated with dropped packets compared to network throughput congestion (e.g., incast). For purposes of illustration, assume that storage server 506A and storage server 506B determine that the retransmit threshold have been exceeded, while storage server 506C determines that the retransmit threshold has not been exceeded. Illustratively, such a determination may occur if the service client 502 (or associated networking components) is selectively dropping packets as incast begins to develop or if the service client 502 has been able to process a larger percentage of packets transmitted from storage server 506C. The storage servers 506A, 506B, and 506C can implement threshold-based algorithms to make a determination of whether incast is occurring. For example, the storage servers 506A, 506B, and 506C can be configured with incast characteristic thresholds that can be evaluated. In other embodiments, the servers 506A, 506B, and 506C can implement machine learning algorithms that utilize network information as inputs and can make one or more conclusions that serve as the determination of whether incast is occurring.

Continuing with the illustrative example, at (2) and (2'), the storage servers 506A and 506B will dynamically adjust the range of latency values to result in an increase of potential latency values that will be utilized to inject latency in the responses from the storage servers 506A and 506B. At (2'''), however, the storage 506C will not increase the latency value ranges because the threshold for retransmissions has not yet been determined. To increase the range of latency values, the storage servers 506A and 506B can implement a wide variety of functions to determine the modifications of the range. In some embodiments, the storage servers 506A and 506B can utilize pre-selected values that increase the upper value of the latency value ranges by predefined incremental amounts. An example of such an increase will be described with regard to FIG. 6B.

In other embodiments, the storage servers 506A and 506B can implement mathematical functions that can correlate the increase in upper value of the range of latency values according to the number of retransmit event that have been observed. For example, the hosts can implement a non-linear function that can dramatically increase the upper range of latency values relative to the potential increase in observed characteristics of incast. In another example, the hosts can implement liner functions such that the upper range of latency values can increase in a manner proportional to the observed incast characteristics or number of measured incidents of incast characteristics. Additionally, in still other embodiments, the storage servers 506A and 506B can increase the lower range of latency values to eliminate the lower values of potential latencies. Illustratively, the increase in the latency value ranges can vary from storage server to storage server depending on consideration of tolerance to increased latencies, customer service levels, or designation of latency growth by the service provider.

Figure 6B:
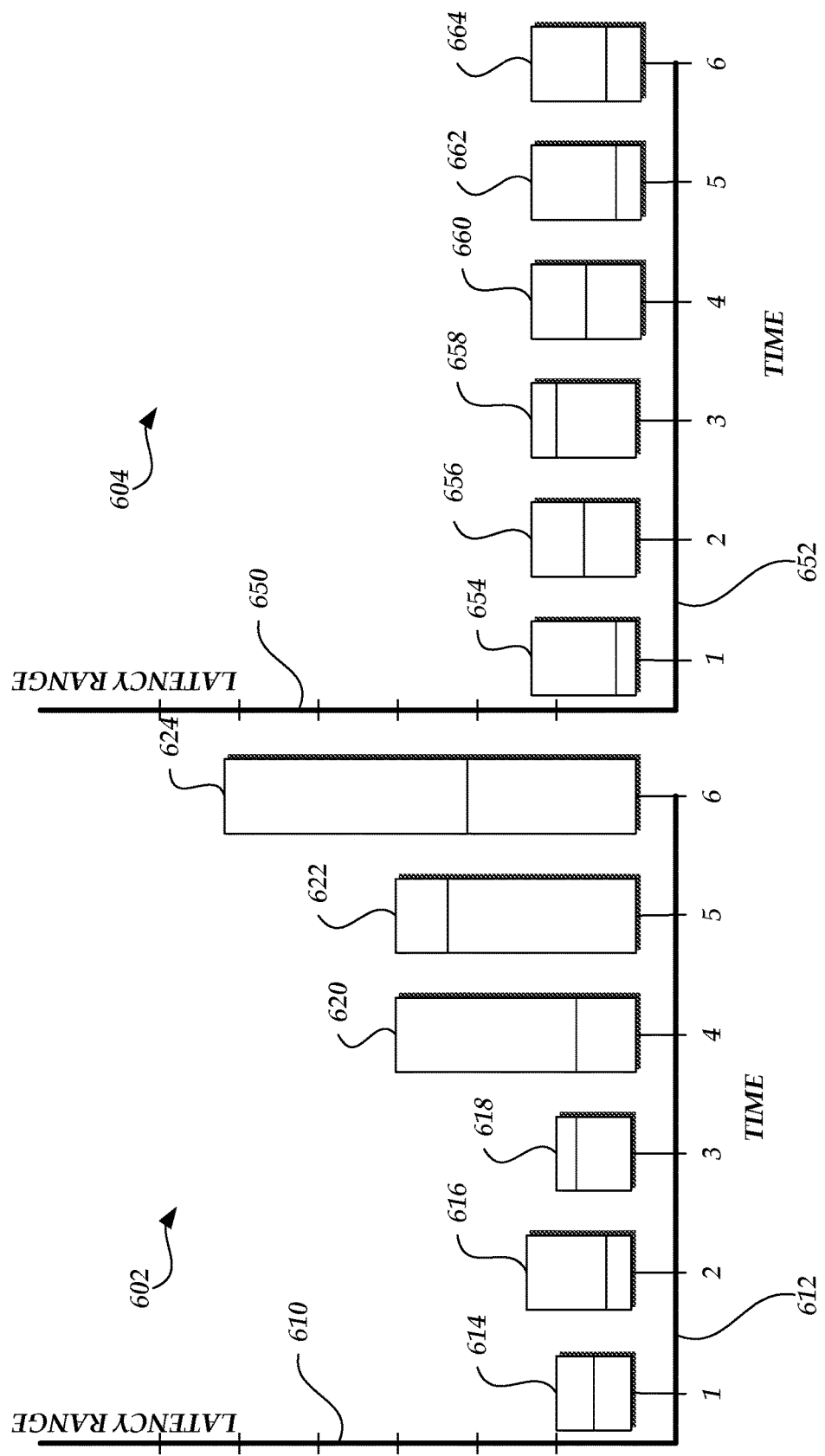
FIG. 6B is a graph comparing the modification of latency ranges based on incast determination in accordance with the present application.

FIG. 6B corresponds to a graph comparing potential latency ranges 602 and 604 for two storage servers, such as storage servers 506A and 506B (FIG. 6A). More specifically, FIG. 6B illustrates a first graph 602 of latency range values over time for a storage server, such as storage server 506A (FIG. 6A), in which the latency range values will change based on a determination of characteristics of incast as described herein. FIG. 6B also illustrates a second graph 604 of latency range values over time for a storage server, such as storage server 506B (FIG. 6A), in which the latency range values will not change because of a lack of determination of characteristics of incast as described herein.

Graph 602 corresponds to an illustration of the range of potential latency values for a storage server (axis 610) over a set of time intervals (axis 612). In graph 602, the first latency range 614 can correspond to a default or baseline latency range from which the storage server 506A will select a latency value. The second latency range 616 at time interval "2" corresponds to a first increase in latency range based on a determination of network information indicative of incast, such as exceeding a first threshold of retransmissions. By way of illustrative example, the increase in the latency range 616 may corresponds to a first incremental increase that is the minimum growth of the values of latency ranges. The third latency range 618 at time interval "3" corresponds to a decrease in the latency range based on a determination of updated network information indicative of incast, such as no longer exceeding the first threshold of retransmissions. In this illustration, the third latency range 618 can correspond to a return to the default or baseline range of latency values for the storage server 506A.

With continued reference to graph 602, the fourth latency range 620 at time interval "4" corresponds to a second increase in latency range values based on a determination of network information indicative of incast, such as exceeding a second threshold of retransmissions. In this example, exceeding the second threshold of retransmission can correspond to a much larger increase of latency range values corresponding to a determination of greater indications of incast characteristics (e.g., network information indicative of incast). By way of illustrative example, the increase in the latency range 620 may corresponds to a second incremental increase that is a much larger growth of the values of latency ranges. The fourth latency range 622 at time interval "5" corresponds to maintenance of the increased latency range, such as correspond to minimal change of incast characteristics. Finally, in the illustrative example, latency range 624 at time interval "6" corresponds to a third increase in latency range values based on a determination of a characteristic of incast, such as exceeding a third threshold of retransmissions. By way of illustrative example, the increase in the latency range 624 may correspond to a third incremental increase (relative to the default or baseline latency range values) that is a much larger growth of the values of latency ranges. One skilled in the relevant art will appreciate that graph 602 illustrates changes in latency range values and that such changes may occur over different time intervals and may include more or less thresholds and value ranges.

For purpose of comparison, graph 604 corresponds to an illustration of the range of potential latency values for a storage server (axis 650) over a set of time intervals (axis 652). Illustratively, the time intervals for graph 604 can correspond to the same time intervals for graph 602. In graph 604, the first latency range 654 can correspond to a default or baseline latency range from which the storage server 506B will select a latency value. In this portion of the illustrative example, the second latency range 656 at time interval "2," third latency range 658 at time interval "3", fourth latency range 660 at time interval "4", fifth latency range 662 at time interval "5" and sixth latency range 664 at time interval "6" all correspond to maintenance of the default or baseline range of latency values for the storage server 506B. For example, if storage server 506B does not determine that the network information indicative of incast have exceeded established thresholds, such as a measurement of dropped packets, the latency for packets exceeding a threshold size will be selected from within the same range of values. One skilled in the relevant art will appreciate that at time intervals beyond those shown in graph 604, the range of latency range values can change in accordance with the present application.

Figure 6C:
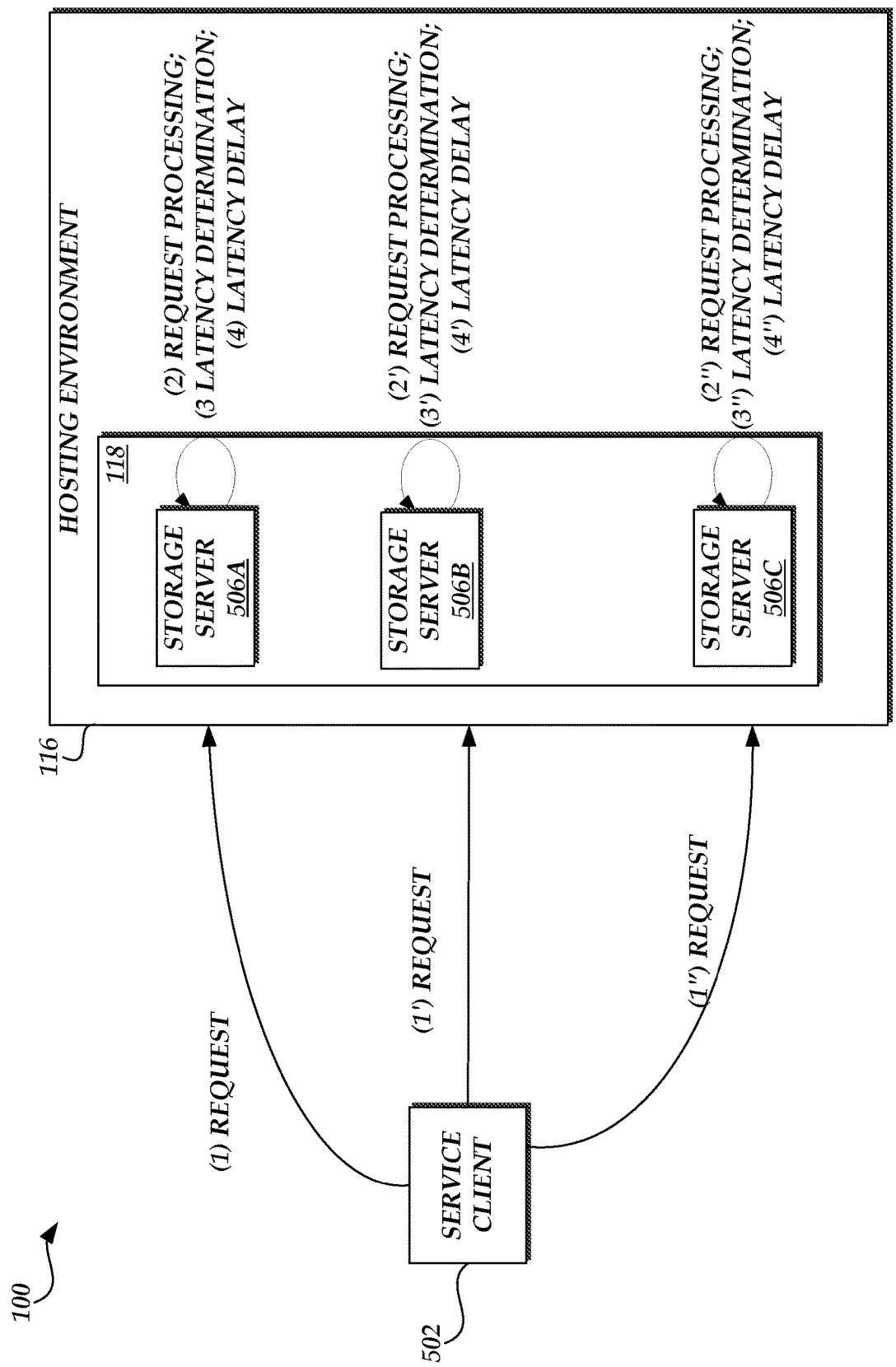
FIGS. 6C-6D are block diagrams of the logical network of FIG. 1 illustrating the adjustment of latency ranges based on incast determination in accordance with the present application.

With reference to FIG. 6C, the service client 502 subsequently transmits three requests for content to the storage servers 506A, 506B, and 506C respectively. Illustratively, each of the requests transmitted by the service client 502 to a respective storage server can be transmitted in accordance with a network protocol, such as TCP, which is a guaranteed delivery network protocol. At (2), each of the respective storage servers conducts a latency determination to determine whether any responsive transmissions should be associated with a latency prior to attempting to transmit to the service client 502. As previously discussed, in some embodiments, the latency determination can be based on whether the size of the requested data transmission exceeds a size threshold, for example 32 KB for each data packet. In other embodiments, the latency determination can be based on a data type identifier that identifies a type of content and whether an additional latency can be acceptable. In still other embodiments, that latency determination can be based on an identifier associated with the service client 502 and whether an additional latency is acceptable according to service level agreements provided the service provider. In still other embodiments, the latency determination can be based on a priority designation provided by the service client 502 regarding the relative importance of the content and whether any additional latency can be tolerated. Other embodiments would be applicable as well. The size threshold can be static in nature (e.g., pre-configured) or dynamically modified by individual storage servers or groups of servers. The requests can be transmitted in a manner as illustrated in FIG. 5B.

Figure 6D:
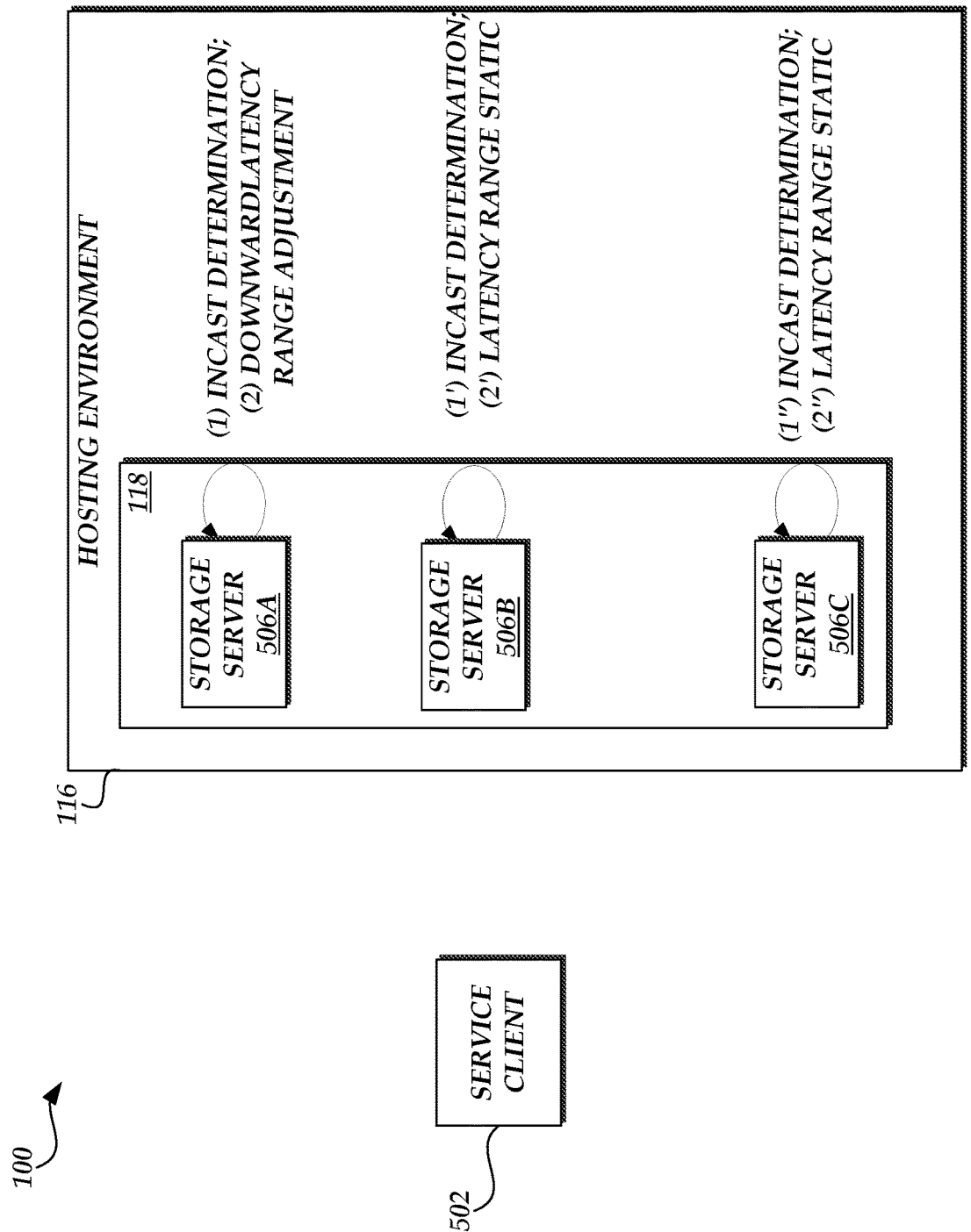

Turning now to FIG. 6D, each of the storage servers 506A, 506B, and 506C can continue to observe characteristics indicative of incast over a period of time. With continued reference to the previous example, each of the storage servers 506A, 506B, and 506C can associate a number of retransmissions as a measure of incast or identify the number of retransmission as network characteristics indicative of incast. More specifically, for individual connections to a service client 502, each storage server can associate maintain a count of a number of retransmission requests that are generated in transmitting requested content to the service client. The count may be a static count experience of a period of time, such as a count of the number of retransmission occurring within a five second time window. In other embodiments, the count can be dynamic, such as a moving window of retransmission counts over a continuous time window. With reference to the previous example, the storage servers 506A and 506B can maintain a count over a moving time window of the fixed length or varying length. Still further, the retransmission count can be a weighted averaged over time to attempt to account for increases or decreases in retransmissions. Accordingly, more recent retransmission events will have a greater impact on the retransmission count. While this embodiment will be described solely with regard to counting retransmit requests, additional or alternative network characteristics can be also be utilized to make incast determinations.

At (1), (1') and (1"), individual storage servers 506A, 506B, and 506C make a determination of whether incast is occurring (or determined to be occurring) with regard communications with the service client 502. Illustratively, each storage server 506A, 506B, and 506C makes an independent assessment of incast by comparing the current retransmit count to a retransmit (or incast) threshold. The retransmit count can be selected to distinguish traditional network inefficiencies associated with dropped packets compared to network throughput congestion (e.g., incast). Each storage server 506A, 506B, and 506C may have a different incast thresholds based on learned behaviors, historical information or user specification. Alternatively, each storage server 506A, 506B, and 506C may share common, or partially common, incast thresholds. Additionally, in some embodiments, the storage servers 506A, 506B, and 506C may have access to different types of network characteristics or measurements indicative of incast and can apply completely different methodologies in determining whether incast is likely occurring. For purposes of illustration, assume that storage servers 506B and 506C determine that the retransmit threshold have been exceeded, while storage server 506A determines that the retransmit threshold has decreased below the incast threshold.

Continuing with the illustrative example, at (2), storage server 506A will dynamically adjust the range of latency values to result in a decrease of potential latency values that will be utilized to inject latency in the responses from the storage servers 506A and 506C. At (2") and (2"'), however, for purposes of illustration, storage servers 506B and 506C will not decrease the latency value ranges because the threshold for retransmissions has not yet diminished below the threshold. To decrease the range of latency values, storage server 506A can implement a wide variety of functions to determine the modifications of the range. In some embodiments, storage server 506A can utilize pre-selected values that decrease the upper value of the latency value ranges in fixed amounts. In other embodiments, storage server 506A can implement mathematical functions that can correlate the decrease in the upper value of the range of latency values according to the number of retransmit events that have been observed. For example, the storage servers can implement a non-linear function that can dramatically decrease the upper range of latency values relative to the potential decrease in observed characteristics of incast (e.g., an exponential decrease). In another example, the storage server 506A can implement liner functions such that the upper range of latency values can decrease in a manner proportional to the observed incast characteristics. Additionally, in still other embodiments, the storage server 506A can decrease the higher range of latency values to eliminate the higher values of potential latencies. Illustratively, the decrease in the latency value ranges can vary from storage server to storage server depending on consideration of tolerance to latencies, customer service levels, or designation of latency growth by the service provider. Additionally, in some embodiments, the window for observing network characteristics related to incast and the function utilized to decrease the range of latency values can be different that the window and function utilized in the increase of the range of values. For example, a storage server, such as storage server 506A, can utilize a relatively small time window to observe network characteristics and an exponential growth to increase latency value ranges and utilize a larger window and linear function to decrease the range of latency values.

Figure 7A:
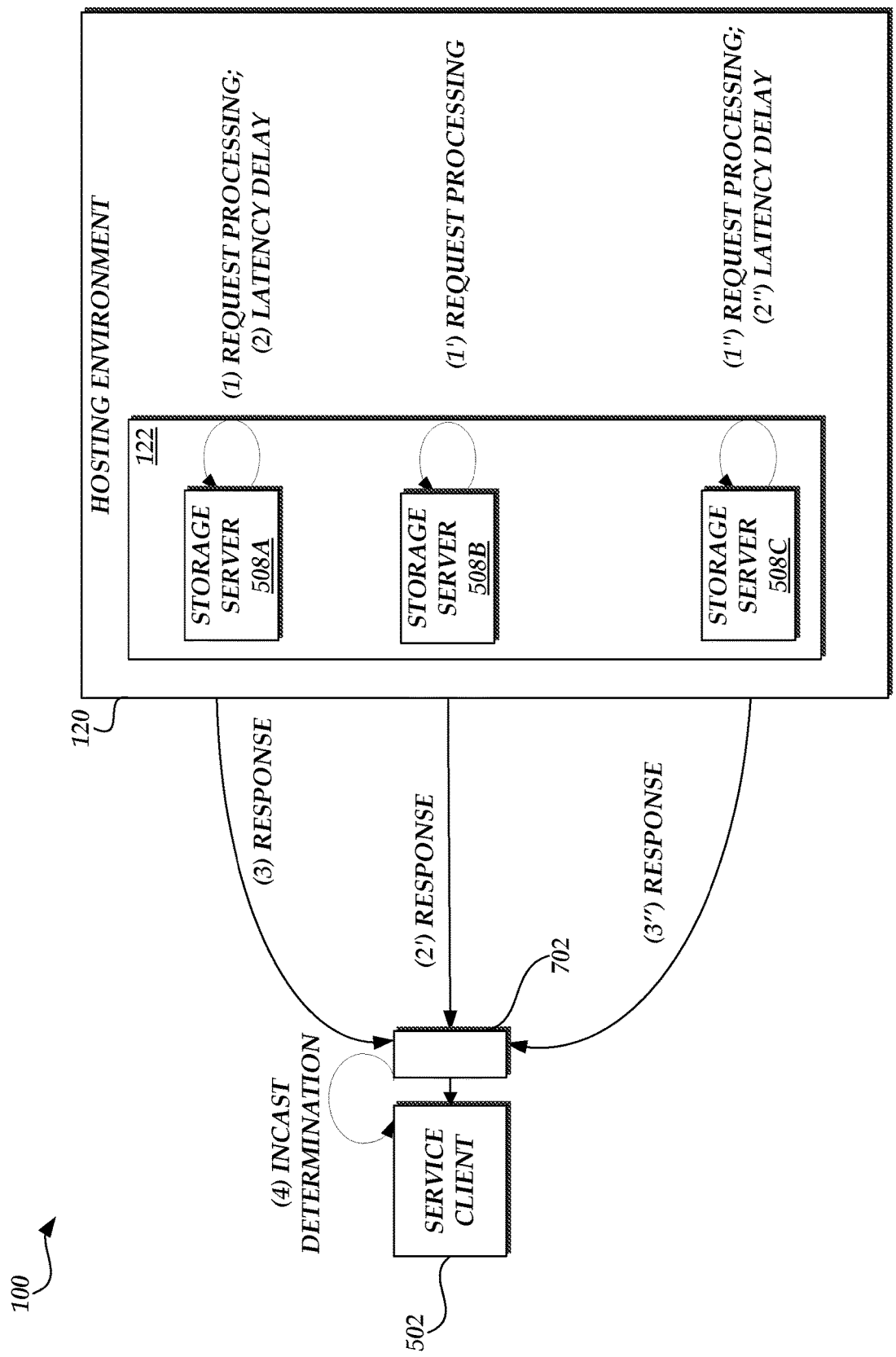
FIGS. 7A-7B are block diagrams of the logical network of FIG. 1 illustrating the requesting and processing data requests utilizing a determined latency in the returned response in accordance with the present application
Figure 7B:
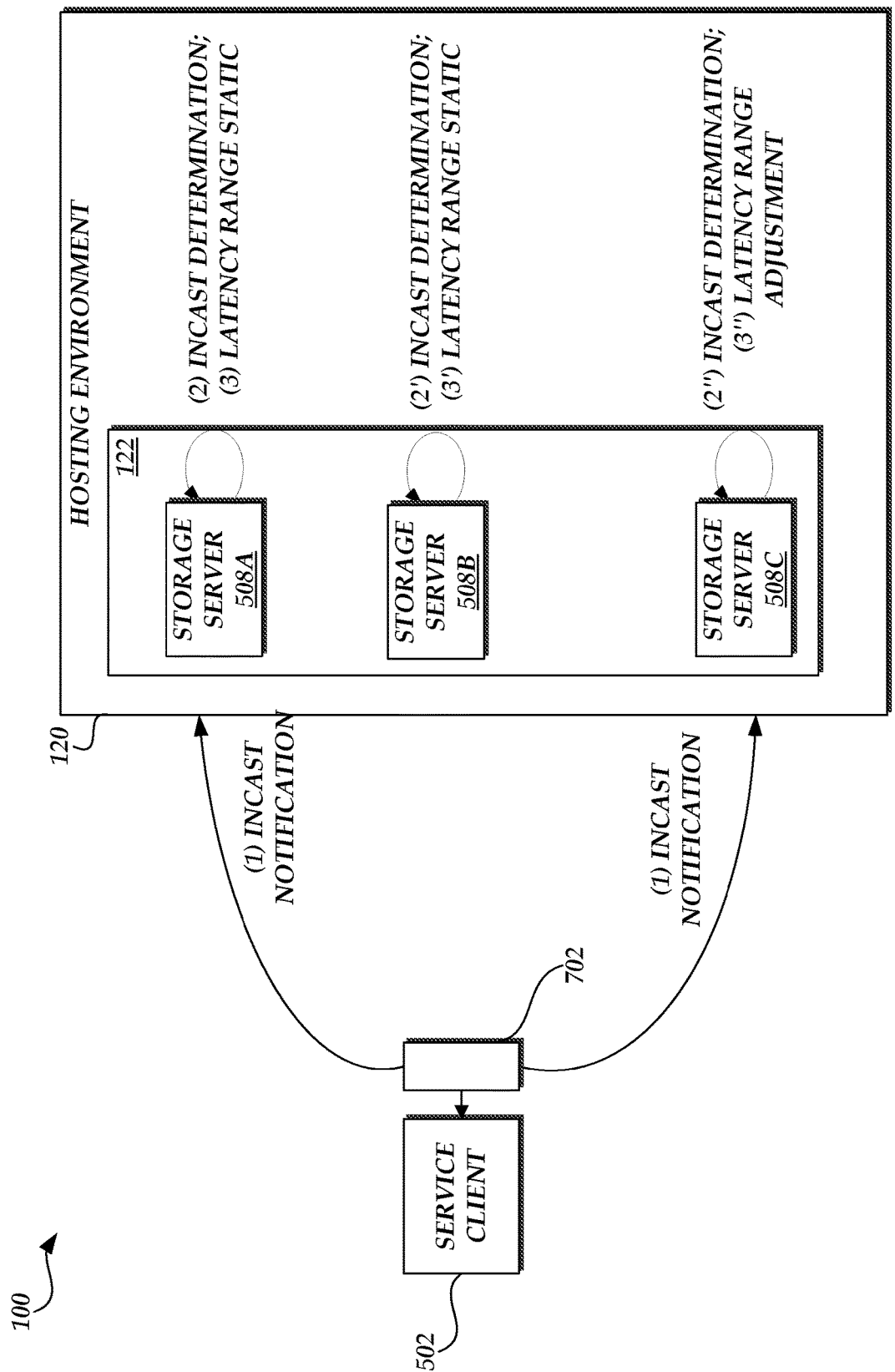

Turning now to FIGS. 7A and 7B, in another embodiment, storage servers 508A, 508B, and 508C hosted within a service, such as service 122 can receive information from network components, such as network component 702, to facilitate a determination of incast for dynamic modification of the range of latency values. For purposes of illustration, FIG. 7A begin after initial requests for content have been transmitted, such as the process illustrated in FIG. 5A or FIG. 6C. With reference to FIG. 7A, at (1), all the storage servers 508A, 508B, and 508C process the requests to obtain the content. For purposes of illustration, the processing of the request has been simplified to illustrate that each of the storage servers 508A, 508B, and 508C independently process the content requests and prepare the content for transmission to the service client 502. At (2) and (2"), the storage servers 508A and 508C conduct a latency determination based on determining a latency from an established range of latency values available to each respective host. Illustratively, individual storage servers such as storage servers 508A and 508C, maintain a range of latency values that can be selected, such as via random selection or pseudo-random selection of a value.

At (3) and (3"), each respective storage server 508A and 508C implements the selected latency and transmits the response to the service client 502 after including the selected latency prior to attempting to transmit the delay. Illustratively, the selected delay for storage servers 508A and 508C will likely be different based on the range of potential values. Still further, even though some storage servers, such as storage servers 508A and 508C, may select the same latency values, the random nature of selection of values for larger numbers of hosts would likely result in at least some differences in selected values. By utilizing the latency determination threshold and the selection of latency values, the three storage servers 508A, 508B, and 508C have staggered the responsive communications to the service client 502. It should be appreciated, however, that the latency determination threshold does not necessarily need to be applied.

At (4), each storage server 508A, 508B, and 508C does not necessarily need to make a determination of whether incast is occurring at the service client 502. Rather, the network equipment 702, such as a router, network switch, etc., can keep track of various network information that can be utilized in the determination of incast or the determination of a likelihood of incast. As previously described, in one embodiment, the network information can include a number of retransmission requests that are received at the network equipment 702. In another embodiment, the network information can include network queue length that indicates that number of outstanding network packets to be received at the service client 502. In still another embodiment, the network information can include a number of dropped data packets or corrupted data packets. Illustratively, the network equipment 702 does not necessarily need to make the determination, but can merely report the observed network information to the storage servers. In other embodiments, the network equipment 702 can be further configured to implement at least a portion of the functionality of the storage servers and make a determination (or recommendation) regarding incast.

Turning now to FIG. 7B, in this embodiment, the network component 702, such as a top of a rack switch, has collected the network information indicative of incast based on processing packets, counting dropped packets, network queue lengths, and the like. At (1), the network component 702 transmits the network information to each respective storage server 508A, 508B, and 508C. For purposes of illustration, assume that only storage server 508C determines that the incast threshold have been exceeded, while storage servers 508A and 508B determine that the incast threshold has not been exceeded. Continuing with the illustrative example, at (2'''), storage server 508C will dynamically adjust the range of latency values to result in an increase of potential latency values that will be utilized to inject latency in the response from the storage servers 508C. At (2) and (2'), however, the storage severs 508A and 508B will not increase the latency value ranges because the threshold for retransmissions has not yet been determined. As previously described, the increase the range of latency values, storage server 508C can implement a wide variety of functions to determine the modifications of the range. Additionally, although not illustrated in FIGS. 7A and 7B, the storage servers 508A, 508B, and 508C can also dynamically modify the range of latency values in a downward direction.

Figure 8:
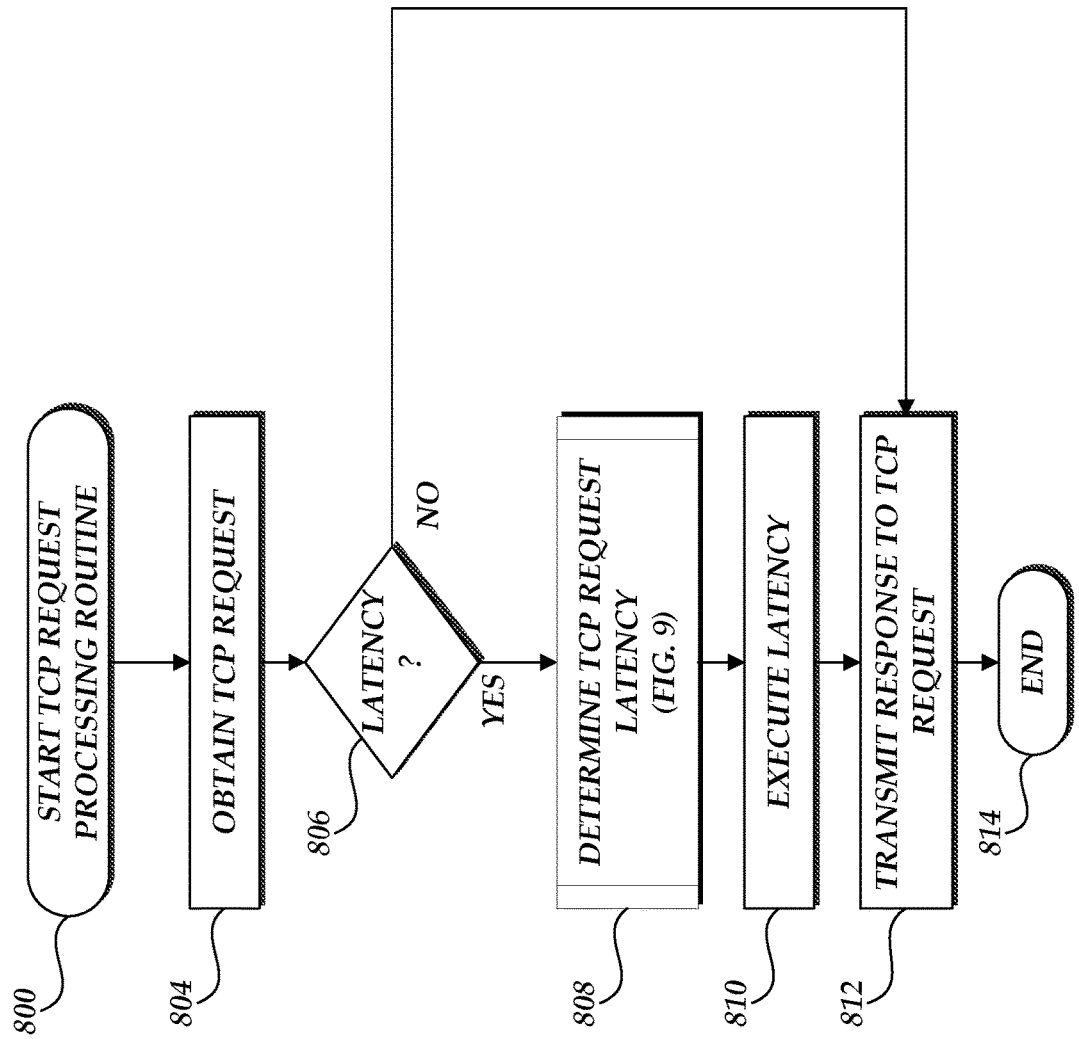
FIG. 8 is a flow diagram illustrative of a data request processing with latency routine implemented by a computing device in accordance with the present application.

FIG. 8 is a flow diagram illustrative of a TCP request processing request implemented by a computing device in accordance with the present application. Illustratively, routine 800 will be described with regard to implementation by a storage server, such as storage servers hosted on any one of services 114, 118, and 122 (FIG. 1) interacting with a service client 502. As previously described, the service client 502 can corresponds to a virtual machine instances hosted on a host computing device on behalf of a customer or an external physical computing device corresponding to the customer. However, routine 800 may be implemented by other computing devices, in whole or in part. At block 802, an individual storage server obtains a TCP request. Illustratively, each of the requests transmitted by the service client 502 to a respecting storage server can be transmitted in accordance with a network protocol, such as TCP, which is a guaranteed delivery network protocol. In such embodiments, the service client 502 may interact with the each respective storage server for purposes of authority, authentication and other handshaking functionality (e.g., establishing network transmission configurations).

At decision block 802, the storage server conducts a latency determination to determine whether any responsive transmissions should be associated with a latency prior to attempting to transmit to the service client 502. Illustratively, in some embodiments, the latency determination can be based on whether the size of the requested data transmission exceeds a size threshold. For example, in one embodiment, individual packet transmissions can corresponds to data sizes between 1 KB to 64 KB. In such an embodiment, a storage server may utilize a 32 KB threshold for each data packet to encompass data exceeding a 50% threshold of maximum data size. In some embodiments, the size threshold can be statically configured. In other embodiments, the storage servers can dynamically modify the size thresholds based on criteria, such as processing latency, customer settings, random selection, and the like. If the latency determination does not indicate that latency should be associated with responding to the content request, the routine 800 will proceed to block 812, described below.

In other embodiments, the latency determination can be based on a data type identifier that identifies a type of content and whether an additional latency can be acceptable. In still other embodiments, that latency determination can be based on an identifier associated with the service client 502 and whether an additional latency is acceptable according to service level agreements provided the service provider. In still other embodiments, the latency determination can be based on a priority designation provided by the service client 502 regarding the relative importance of the requested content and whether any additional latency can be tolerated. Other embodiments would be applicable as well.

If at decision block 804 a determination is that the latency threshold has been met, at block 808, the storage server determines a latency value. Illustratively, individual storage servers maintain a range of latency values that can be selected, such as via random selection or pseudo-random selection of a value. As will be described in detail below, an initial range, or default range, of potential values can correspond to 600 to 800 microseconds of potential latency. Additionally, as will be described below, the storage server can also adjust the latency range based on network characteristics indicative of incast. A more detailed description of an embodiment for selection a latency value and adjusting latency ranges will be described with regard to sub-routine 900 (FIG. 9).

At block 810, the storage server implements the selected latency. At block 812, the storage server transmits the response to the service client after including the selected latency prior to attempting to transmit the delay or directly if no latency is determined at decision block 806. Illustratively, the selected delay for multiple storage servers will likely be different based on the range of potential values. Still further, even though some storage servers may select the same latency values, the random nature of selection of values for larger numbers of storage servers would likely result in at least some differences in selected values. At block 814, the routine 800 terminates.

Figure 9:
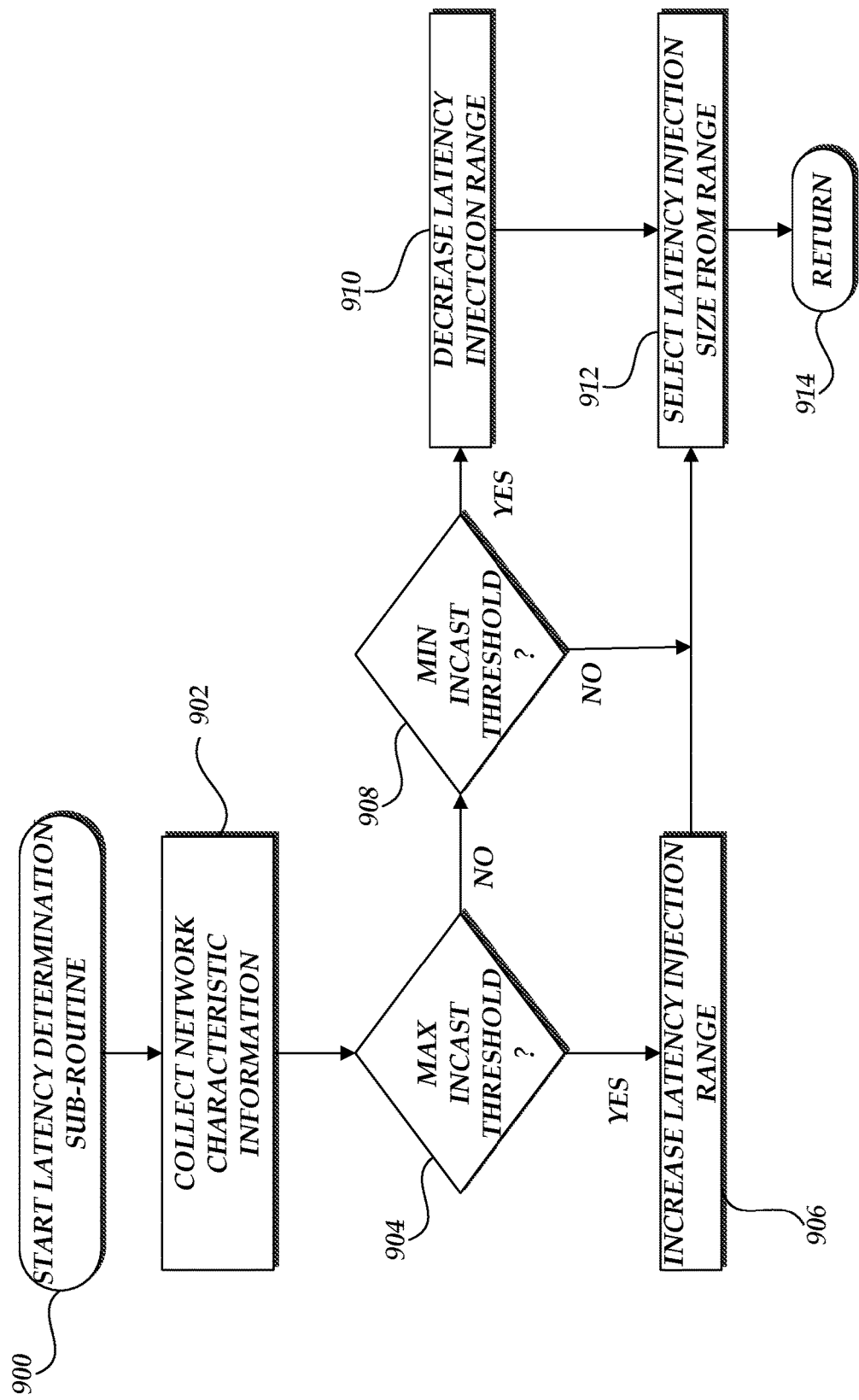
FIG. 9 is a flow diagram illustrative of a latency determination sub-routine implemented by a computing device in accordance with the present application.

Turning now to FIG. 9, a sub-routine 900 implemented by a computing device for determining a TCP latency value and adjusting TCP latency value ranges will be described. Illustratively, sub-routine 900 can be implemented by a storage server as part of the block 808 of FIG. 8. In a manner similar to routine 800 (FIG. 8), routine 900 will be described with regard to implementation by a storage server, such as storage servers on services 114, 118, and 122 (FIG. 1) interacting with a service client 502.

At block 902, the storage server can collect information reporting network characteristic information, such as by observing characteristics indicative of incast over a period of time. In one example, individual storage servers can associate a number of retransmissions as network characteristics of incast. More specifically, for individual connections to a service client 502, each storage server can associate maintain a count of a number of retransmission requests that are generated in transmitting requested content to the service client. The count may be a static count experience of a period of time, such as five second time window. In other embodiments, the count can be a moving window of retransmission counts. Still further, the retransmission count can be a weight averaged over time to attempt to account for increases or decreases in retransmissions. While this embodiment will be described solely with regard to counting retransmit requests, additional or alternative network characteristics can be also be utilized to make incast determinations. One such example was described with regard to FIGS. 7A and 7B.

At decision block 904, a test is conducted to make a determination of whether incast is occurring at the service client 502. Illustratively, in one embodiment, the individual storage server can compare the current retransmit count to a retransmit (or incast) threshold. The retransmit count can be selected to distinguish traditional network inefficiencies associated with dropped packets compared to network throughput congestion (e.g., incast). For example, an incast determination may be made for one storage server over another storage server if the service client (or associated networking components) is selectively dropping packets as incast begins to develop or if the service client 502 has been able to process larger percentage of packets transmitted from a storage server, such as smaller data sized packets.

In other embodiments, the count can be a moving window of retransmission counts. Still further, the retransmission count can be a weight averaged over time to attempt to account for increases or decreases in retransmissions. As will be explained in greater detail below, the storage servers 506A, 506B, and 506C can implement machine learning algorithms that can be utilized in context with the moving windows to make characterizations of whether incast is present. Additionally, the incast determination can be based on a machine learning algorithm that utilizes one or more inputs of network information. Illustratively, the machine learning algorithm can be configured based on a test set of inputs in which an occurrence of incast has been determined. The inputs can include one or more of the network information, such as a number of retransmit events, queue lengths, information regarding a number of dropped packets, measure of processing latencies, and the like. Based on the inputs, the machine learning algorithm can be configured to receive network information as inputs and make the determination of whether network information is characteristic of the presence of incast.

If at decision block 904, a determination is made that the maximum incast threshold has been reached, at block 906, the storage server will dynamically adjust the range of latency values to result in an increase of potential latency values that will be utilized to inject latency in the responses. To increase the range of latency values, the storage server can implement a wide variety of functions to determine the modifications of the range. In some embodiments, the storage server can utilize pre-selected values that increase the upper value of the latency value ranges. In other embodiments, the storage server can implement mathematical functions that can correlate the increase in upper value of the range of latency values according to the number of retransmit events that have been observed. For example, a storage server can implement a non-linear function that can dramatically increase the upper range of latency values relative to the potential increase in observed characteristics of incast. In another example, a storage server can implement liner functions such that the upper range of latency values can increase in a manner proportional to the observed incast characteristics. Additionally, in still other embodiments, a storage server can also independently increase the lower range of latency values to eliminate the lower values of potential latencies. Illustratively, the increase in the latency value ranges can vary from storage server to storage server depending on consideration of tolerance to increased latencies, customer service levels, or designation of latency growth by the service provider.

Alternatively, at decision block 904, if the maximum incast threshold has not been met, at decision block 908, a test is conducted to determine whether a minimum incast threshold has been met. Illustratively, the minimum incast threshold can correspond to one or more thresholds that determine whether network characteristics indicative of incast have begun to decrease or disappear that can result in the dynamic modification of the range of latency values. The thresholds for the maximum and minimum number of incast events may be different. For example, a storage server may be configured with a lower threshold to increase the range of latency values, while maintaining a higher threshold (e.g., the minimum threshold) prior to decreasing the range of latency values. Additionally, in some embodiments, the storage server can utilize different functions for counting incast, such as an absolute count for determining whether to increase the latency range and an averaged window prior to decrease the latency range. If the minimum threshold is not satisfied, the routine 900 proceeds to block 912, described below.

Alternatively, if at decision block 908, a determination is made that the minimum threshold has been met (e.g., the incast events fall below the threshold), at block 910, the storage server decreases the range of latency values. To decrease the range of latency values, the storage server can implement a wide variety of functions to determine the modifications of the range. In some embodiments, a storage server can utilize pre-selected values that decrease the upper value of the latency value ranges. In other embodiments, a storage server can implement mathematical functions that can correlate the decrease in upper value of the range of latency values according to the number of retransmit events that have been observed. For example, the storage server can implement a non-linear function that can dramatically decrease the upper range of latency values relative to the potential decrease in observed characteristics of incast. In another example, the storage server can implement liner functions such that the upper range of latency values can decrease in a manner proportional to the observed incast characteristics. Additionally, in still other embodiments, the storage server can independently decrease the upper range of latency values to eliminate the lower values of potential latencies. Illustratively, the decrease in the latency value ranges can vary from storage server to storage server depending on consideration of tolerance to latencies, customer service levels, or designation of latency growth by the service provider. Additionally, in some embodiments, the storage servers can utilize a first time window for observing network characteristics related to incast and the function utilized to increase the range of latency values while utilize a second, different time window and function for observing network characteristics related to a potential decrease in incast. For example, storage server can utilize a narrow time window and function to rapidly increase the range of based on observed incast and a broader window and less rapid function to decrease the range of latency values.

Once the latency range has been increased (block 906) or the minimum incast threshold has not been met (decision block 908), or the latency range has been decreased (block 910), at block 912, the storage server selects a latency value. As previously described, individual storage servers select a latency value utilize a selection value, such as via random selection or pseudo-random selection of a value. In other embodiments, the storage servers may cycle through a set of values (e.g., round robin selection). At block 914, the sub-routine 900 returns.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for managing network-based content requests comprising:
   at least a first computing device hosting a virtual compute service providing virtual compute instances; and
   at least a second computing device hosting a block-based storage service, wherein the block-based storage service:
      obtains a request for content from a virtual compute instance of the virtual compute instances of the virtual compute service;
      determines that the content for which the request is obtained satisfies a content size threshold;
      obtains network information indicative of a measure of incast associated with the virtual compute instance from which the request for content is obtained;
      determines that the measure of incast satisfies an incast threshold;
      modifies a network latency range based at least in part on the measure of incast satisfying the incast threshold;
      selects a response latency from the modified network latency range, wherein:
         the selected response latency delays transmission of a first response from the block-based storage service, and
         the first response corresponds to a first portion of the content for which the request is obtained; and
      transmits the first response to the request for the content in accordance with the selected response latency.

2. The system as recited in claim 1, wherein the block-based storage service modifies the content size threshold based at least in part on the measure of incast.

3. The system as recited in claim 1, wherein the block-based storage service further:
   determines that a second portion of the content for which the request is obtained does not satisfy the content size threshold; and
   transmits a second response to the request for the content without the selected response latency.

4. The system as recited in claim 1, wherein to modify the network latency range based at least in part on the measure of incast indicated in the obtained network information, the block-based storage service:
   determines that the measure of incast indicated in the obtained network information satisfies the incast threshold; and
   increases the network latency range.

5. The system as recited in claim 4, wherein the block-based storage service further:
   determines that the incast threshold is no longer satisfied; and
   decreases the modified network latency range.

6. The system as recited in claim 4, wherein the block-based storage service further:
   determines that the incast threshold is no longer satisfied; and
   selects a second response latency from the modified network latency range without further modifying the response latency range.

7. The system as recited in claim 1, wherein the block-based storage service further:
   obtains updated network information indicative of an updated measure of incast associated with the virtual compute instance from which the request for content is obtained; and
   exponentially increases the modified network latency range based at least in part on the obtained updated network information indicative of the updated measure of incast.

8. The system as recited in claim 1, wherein the block-based storage service further:
   obtains updated network information that indicates incast is not associated with the virtual compute instance from which the request for content is obtained; and
   linearly decreases the modified network latency range based at least in part on the updated network information.

9. The system as recited in claim 1, wherein the measure of incast indicated in the obtained network information includes a count of a number of network retransmissions to the virtual compute instance from which the request for content is obtained.

10. The system as recited in claim 1, wherein the measure of incast indicated in the obtained network information includes a queue length from a network component associated with the virtual compute instance from which the request for content is obtained.

11. A computer-implemented method comprising:
obtaining, at a storage server in a block-based storage service, a request for content from a compute instance, wherein the storage server hosts at least a portion of a storage volume;
determining, by the storage server, that the content for which the request is obtained satisfies a content size threshold;
obtaining, by the storage server, network information indicative of a measure of incast associated with the compute instance from which the request for content is obtained;
determining, by the storage server, that the measure of incast satisfies an incast threshold;
increasing, by the storage server, a response latency range;
selecting, by the storage server, a response latency from the increased response latency range, wherein the selected response latency delays transmission of a first response from the storage server, and wherein the first response is associated with a first portion of the content for which the request is obtained; and
transmitting, by the storage server, the first response to the request for content in accordance with the selected response latency.

12. The computer-implemented method as recited in claim 11 further comprising:
determining, by the storage server, that a second portion of the content for which the request is obtained does not satisfy the content size threshold; and
transmitting, by the storage server, the second response to the request for content without the selected response latency.

13. The computer-implemented method as recited in claim 11 further comprising:
determining, by the storage server, that the incast threshold is no longer satisfied; and
selecting, by the storage server, an updated response latency from the increased response latency range.

14. The computer-implemented method as recited in claim 11 further comprising:
determining, by the storage server, that updated network information indicative of an updated measure of incast associated with the compute instance from which the request for content is obtained indicates that the incast threshold is no longer satisfied; and
decreasing, by the storage server, the increased response latency range.

15. The computer-implemented method as recited in claim 11, wherein the obtained network information indicative of the measure of incast associated with the compute instance from which the request for content is obtained includes a count of a number of network retransmissions to the compute instance.

16. A non-transitory computer readable-medium including computer-executable instructions that, when executed by a system having at least one processor and memory, cause the system to at least:
obtain a request for content from a computing device;
determine a network characteristic associated with communication throughput to the computing device from which the request for content is obtained;
modify a network latency range based at least in part on a measure of incast associated with the computing device from which the request for content is obtained, wherein the measure of incast is determined using a machine learning algorithm that is provided the determined network characteristic as input;
select a response latency from the modified response latency range; and
transmit a response to the request for content in accordance with the selected response latency.

17. The non-transitory computer-readable medium as recited in claim 16, including further computer-executable instructions that, when executed by the system having at least one processor, cause the system to at least:
determine that the content for which the request is obtained satisfies a content size threshold.

18. The non-transitory computer-readable medium as recited in claim 16, wherein the network latency range is modified based at least in part on an incast threshold.

19. The non-transitory computer-readable medium as recited in claim 16, wherein the network characteristic associated with the communication throughput to the computing device from which the request for content is obtained, is based at least in part on at least one of a network characteristic measured by the system or an measure of a network characteristic obtained from another source.

20. The non-transitory computer-readable medium as recited in claim 16, wherein the network characteristic associated with the communication throughput to the requesting computing device from which the request for content is received, is based at least in part on a weighted moving average of network characteristics over a defined time period.

* * * * *